United States Patent [19]

Holt et al.

[11] 4,023,165

[45] May 10, 1977

[54] SIGNAL MODIFICATION TECHNIQUES

[75] Inventors: Robert Alan Holt, Alhambra; Kenneth Charles Adam, Thousand Oaks, both of Calif.

[73] Assignee: RCA Corporation, New York, N.Y.

[22] Filed: June 2, 1975

[21] Appl. No.: 583,186

[52] U.S. Cl. .................. 343/5 W; 340/324 AD; 343/5 DP; 343/5 VQ
[51] Int. Cl.² .................. G01S 9/60; G06F 3/14
[58] Field of Search ............ 343/5 W, 5 DP, 5 VQ; 340/324 AD

[56] References Cited

UNITED STATES PATENTS

| | | | |
|---|---|---|---|
| 2,939,129 | 5/1960 | Atlas et al. | 343/5 W |
| 3,573,789 | 4/1971 | Sharp et al. | 340/324 AD |
| 3,789,386 | 1/1974 | Itoh | 340/324 AD |
| 3,921,164 | 11/1975 | Anderson | 340/324 AD |

OTHER PUBLICATIONS

IEEE Transactions on Geoscience Electronics, Apr. 1970, vol. GE-8, No. 2, pp. 88–94.

*Primary Examiner*—Maynard R. Wilbur
*Assistant Examiner*—Richard E. Berger
*Attorney, Agent, or Firm*—Raymond E. Smiley; Joseph D. Lazar; H. Christoffersen

[57] ABSTRACT

Signals producing each spot in a digital two-dimensional spot matrix display, such as in a digital weather radar, are compared on a spot-by-spot basis with signals for immediately proceeding and following spots in each dimension. When the preceding and following spots have the same value, the spot being compared is caused to have that same value when displayed. The comparing circuitry may be provided signals from a radar antenna which receives, serially, signals at succeeding range points at a given azimuth and then at the same range points at succeeding azimuths. Signals at each given range at a plurality of succeeding azimuths may be averaged to produce an improved visual display. The compared signals may be further smoothed by averaging signals for succeeding azimuths and displaying the averaged signals alternating with the unaveraged signals.

7 Claims, 5 Drawing Figures

SIGNAL MODIFICATION TECHNIQUES

BACKGROUND OF THE INVENTION

Recently devices have become commercially available for digitally displaying weather radar signals in a range and azimuth matrix of spots, each at one of a given number of visually distinctive brightness levels. The signals received by the weather radar antenna may contain noise which would appear on the display as individual spots having visually different values from surrounding spots.

It is also common for the rate of signal input to differ from the rate of output to the display means. Therefore, buffering means must be supplied. The cost of the buffer is related to its storage capacity: the greater the capacity, that is, the greater the number of spot values it stores, the greater the cost. Yet, it is desirable to have a high degree of resolution, i.e., a high number of azimuth lines and/or range points at each azimuth displayed. A solution utilized in one commercially available digital radar is to display two succeeding azimuth lines having the same information content. This solution, however, adversely affects the smoothness and apparent accuracy of the display.

SUMMARY OF THE INVENTION

In a display device for displaying a two-dimensional spot matrix, each spot being any one of a number of visually different characteristics, a means is provided for producing serial digital signals, the values of which represent the characteristic of the spots in the pattern. The signals may include noise such that random ones of the signals have undesired values. A means is responsive to each digital signal having value $X_i$ (where $i$ represents the location) for comparing it with the immediately preceding and following signals $X_{i-1}$ and $X_{i+1}$ respectively, and for providing a signal having the same value as the compared signal except when $X_{i-1} = X_{i+1}$, and for then producing a signal having the value $X_{i+1}$. A display means is responsive to signals from the comparing means for displaying the spot matrix whereby a more visually pleasing pattern is displayed than if said comparing apparatus were not operative.

In one embodiment, a digital radar display is provided wherein the spot matrix is in the form of range and azimuth lines. A storage means is provided which stores signals only for every other azimuth line to be displayed. Smoothing means are interposed between the storage and display which causes succeeding stored azimuth signals to be displayed alternating with the average of succeeding azimuth signals.

DETAILED DESCRIPTION OF THE DRAWING

Figure 1:
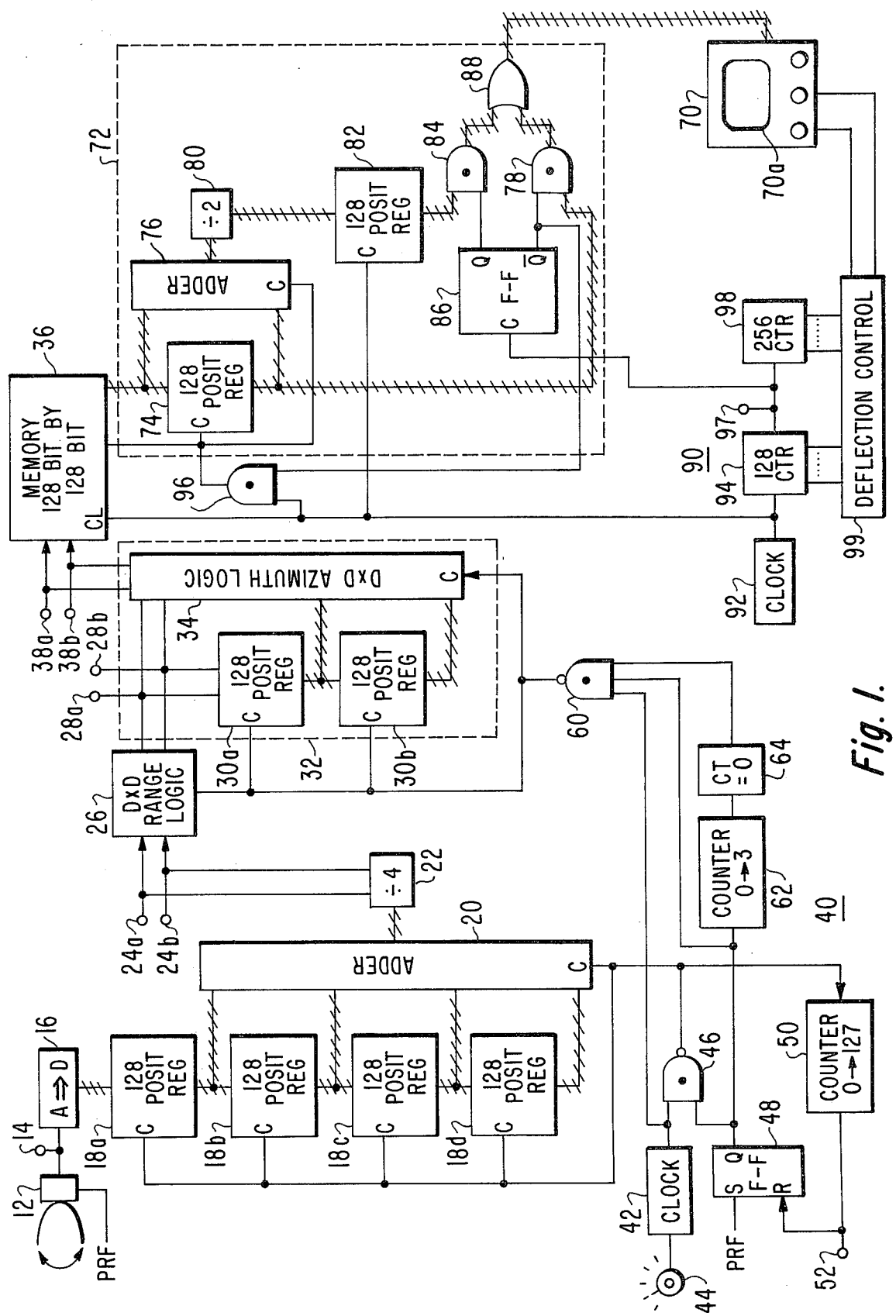
FIG. 1 is a preferred embodiment of an overall block diagram of a digital weather radar display.

Referring to FIG. 1, a weather radar antenna 12 of conventional design is adapted to swing through an arc typically 60° either side of a center line (i.e. 120° total) in incremental steps. The antenna is advanced one step (there being 512 such steps in one working embodiment) each time a pulse repetition frequency (PRF) signal is applied to it from a source not shown. The antenna alternately advances clockwise and then counter-clockwise to its limits, as periodic PRF signals are applied.

The PRF signal also causes a pulse to be emitted from the antenna resulting in a series signal being returned to the antenna indicative of meteorological or terrain conditions directly in front of the antenna. Signals returned to the antenna are converted into electronic signals at terminal 14, the values of which over time relate to the meteorological condition at increasing distances from the antenna. All this is well known in the prior art, and needs no further explanation.

Terminal 14 is coupled to the input terminal of analog-to-digital (A-D) converter 16, which converts the analog signal from antenna 12 into a series of digital signals, each representing the density of the material at incrementally separated range points in advance of the antenna. For example, a scale of 4 may be chosen so that 0 may represent clear sky, 3 may represent a storm cloud, while 1 and 2 represent intermediate values. The output terminal of A-D converter 16 is coupled to the first of four series coupled 128 position registers 18a, 18b, 18c, 18d (hereinafter referred to as "18" unless otherwise stated). In an embodiment wherein the A-D converter 16 produces four different values as outlined above, two sets of 128 bit registers would be necessary to store in binary form four different values. That is, one set of registers would store the $2^0$ bits while the other set would store the $2^1$ bits. However, for simplicity in the drawing, only one set of elements is shown. Cross-hatching on interconnecting lines indicates a plurality of lines.

The output terminals of 128 position registers 18 are coupled to an averaging circuit comprising series coupled adder 20 and divider 22 as will be described more fully. By means of elements 18, 20 and 22, returns from antenna 12 at four succeeding azimuth positions (i.e. angles) are averaged, range point by range point, with the results presented range point (hereinafter referred to as RP) serial at RP terminals 24a and 24b of divider 22. Terminals 24a, b, are coupled to the input terminals of a DXD range logic circuit 26, which will be described in detail in connection with FIG. 2. The DXD logic 26 examines each incoming RP value, $X_i$, comparing it with the immediately preceding and following RPs $X_{i-1}$ and $X_{i+1}$. A signal having the value of range point $X_i$ is presented at output terminals 28 except when $X_{i-1} = X_{i+1}$, in which case a signal having the value $X_{i\ 1}$ (i.e. an RP having the value $X_{i-1}$ or $X_{i+1}$, which, of course, are identical) is presented at terminals 28a, 28b.

Digital signals at terminals 28a, 28b are applied to two series coupled 128 position registers 30a and 30b of DXD azimuth circuitry 32, which will be described more fully in connection with FIG. 3. Terminals 28a, 28b, as well as the output terminals of output registers 30a and 30b are coupled to DXD azimuth logic 34. The DXD azimuth circuit 32 accomplishes the same thing in azimuth as DXD range logic 26 does in range. That is, each range point $X_{ij}$ (where $X_{ij}$ indicates the ith range point in the jth azimuth position) at a given azimuth location $Y_j$ is compared with RPs $X_{i(j+1)}$ and $X_{i(j-1)}$ at the same range at immediately preceding and following azimuth locations $Y_{j+1}$ and $Y_{j-1}$. Then, the result $X_{ij}$ or $X_{i(j+1)}$, as previously described in connection with the range logic 26 are applied RP serially into a 128 position by 128 position memory 36.

It will be remembered that, as described previously, if four different digital signal levels are allowed, each of registers 30a and 30b and memory 36 are pairs of registers and a pair of memories, respectively.

The manipulation of digital data from A-D converter 16 to memory 36 is under control of clock control circuitry 40. A source of clock signals 42, which is basically a voltage controlled oscillator with some shaping circuits, is adapted to produce periodic momentary logic 1 pulses, the period of which is determined by switch 44 coupled to clock source 42. Switch 44 may be set at any one of a number of positions representing different distance ranges desired to be displayed on the radar screen. By way of example, it may be set to as little as 2 miles or as much as 300 miles or to any one of several intermediate points. The effect of the position of switch 44 is to adjust the time required for clock source 42 to produce 128 logic 1 pulses representing 128 distinct range points. When switch 44 is set to two miles, for example, 128 uniformly spaced clock pulses will be produced in the time required for the return of signals two miles distant to antenna 12. Logic pulses from clock 42 periodically enable NAND gate 46 when it is primed by a logic 1 at the Q terminal of flip-flop 48. Flip-flop 48 is set (logic 1 at the Q terminal) by PRF signal, the same signal that advances antenna 12 to the next azimuth position and the same signal that causes a pulse to be transmitted by the antenna. The output terminal of NAND gate 46 is coupled to each of registers 18, to the control (C) terminal of adder 20, and to a counter 50. Logic 0 pulses at the C terminal of registers 18 advance data RP by RP through each register and into the next succeeding register (except, of course, for register 18d).

Counter 50 is a 128 stage counter responsive to each logic 0 signal from gate 46 by incrementing by one, incrementing from a count of 0 to a count of 127, and then returning to a count of 0 every 128th pulse. The momentary signal at terminal 52 produced when counter 50 resets from 127 to 0 is applied to the reset (R) terminal of flip-flop 48 to reset the flip-flop, disabling gate 46 until the next PRF signal is applied thereto.

The Q terminal of flip-flop 48 is coupled to NAND gate 60 and counter 62. Counter 62, which has four stages, increments by one at the leading edge of each logic 1 signal from the Q terminal of flip-flop 48. When counter 62 is at a count of 3, the next pulse will reset it to 0. Decoder circuit 64, coupled to counter 62, produces a logic 1 signal when counter 62 is at a count of 0. The output terminal of decoder 64 is coupled to the third input terminal of NAND gate 60.

The output terminal of NAND gate 60 is coupled to range logic 26, registers 30a and 30b and azimuth logic 34. Therefore, when counter 62 is at a count of 0, and when flip-flop 48 is set, NAND gate 60 is primed. Therefore, each logic 1 from clock 42 enables NAND gate 60 to produce a momentary logic 0 to control the elements to which it is coupled in a manner to be described.

Memory 36, which receives signals from azimuth logic 34 under control of clock 42 is of the type which can be independently written into and read out from concurrently. Memory 36, which is continually being updated from new inputs to antenna 12, continually stores in succeeding locations data from 128 azimuth lines, each line containing 128 RPs. As will be described shortly in more detail, the radar will display 256 (i.e. 2 × 128) azimuth lines, each of 128 range points. It would therefore be desirable to store data for all 256 azimuth lines in memory 36. Unfortunately, such a memory, being twice as large in capacity as memory 36, would tend to be more costly. Therefore, memory 36 is coupled to a CRT display 70 via a smoothing circuit 72.

The output terminal of memory 36 is coupled to the input terminal of 128 position register 74, and to adder 76. The output terminal of register 74 is also coupled to adder 76 and to one input of AND gate 78. The output terminal of adder 76 is coupled to a divide-by-2 circuit 80. The input and output terminals of a 128 position shift register 82 are coupled respectively to divide-by-2 circuit 80 and as one input of AND gate 84. The Q and Q̄ terminals of flip-flop 86 are coupled respectively to the second input terminals of gates 84 and 78. The output terminals of gates 78 and 84 are coupled to an OR gate 88, the output terminal of which is connected to CRT display 70.

While the operation of smoothing circuit 72 will be described more fully shortly, a brief description of its operation is as follows. The 128 RPs for each succeeding azimuth line are transferred RP-by-RP from memory 36 into shift register 74. Incoming RPs are added to outgoing RPs one at a time, and the result is divided by 2 to produce an average Rp value, which is stored in register 82. Thus, RPs at identical ranges at succeeding azimuth positions are averaged. As RPs exit from register 74, they are also passed through gate 78 (assuming flip-flop 86 is producing a logic 1 at the Q terminal), and through gate 88 to be displayed by display 70. After all 128 range points at a given azimuth have been read from register 74, flip-flop 86 is toggled so that 128 averaged RPs may be read from register 82 via gates 84 and 88 into display 70. Thereafter, the next azimuth line stored in memory 36 is displayed as previously described and simultaneously averaged with the still next azimuth line as described above.

Thus, if, for example, succeeding azimuth lines stored in memory 36 are arbitrarily labelled A, B, C, etc., the following azimuth lines will be successively displayed in display 70: A, A+B/2, B, B+C/2, C, etc. Where a value half way between two permitted brightness levels is computed, the results may be rounded up or down, depending on pre-established rules.

Control of smoothing circuit 72 is by means of a clock circuit 90. A second source of clock pulses 92 is adapted to produce periodic momentary logic 1 pulses at a rate that will produce on display 70 a flicker-free picture. The output terminal of clock 92 is coupled to a 128 stage counter 94, the C input terminal of register 82, one input of AND gate 96, and to the CL terminal of memory 36. The second input terminal of gate 96 is from the Q terminal of flip-flop 86. Counter 94 advances one for each logic 1 pulse from clock 92 advancing from 0 through 127, then back to 0. As counter 94 steps back to 0, a logic 1 pulse appears at terminal 97, which is coupled to a counter 98 and to the C input terminal of flip-flop 86. The pulse at terminal 97 advances counter 98 by 1 and toggles flip-flop 86 into the opposite state. That is, if Q is at logic 1 and Q̄ is at logic 0 after the pulse Q will be at logic 0 and Q̄ will be at logic 1. Both counters 94 and 98 are coupled to deflection control circuitry 99. The count in counter 94 is continually indicative of the position of the RP signal being applied to display 70, while the count in counter 98 is indicative of the azimuth line to which the RP belongs. Deflection control circuitry 99 controls the horizontal and vertical deflection plates of display 70, causing each RP to be properly positioned on the screen 70a.

Figure 2:
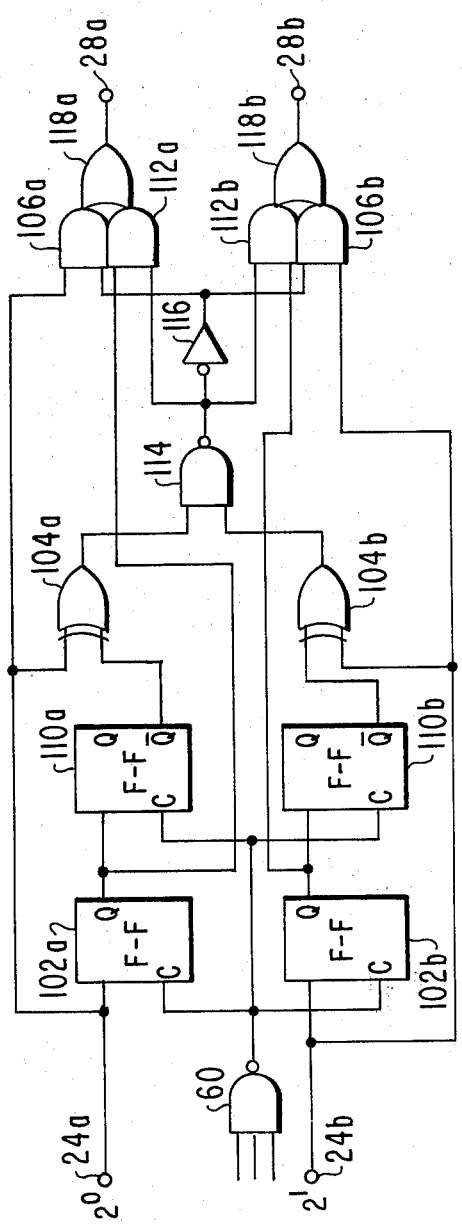
FIG. 2 is a logic diagram of a range comparing circuit useful in the radar of FIG. 1.

The DXD range logic 26 is illustrated in detail in FIG. 2, to which attention is now directed. All the hardware needed to handle a four level digital code is illustrated. Terminals 24a, b, 28a, b, and NAND gate 60 are reproduced from FIG. 1 for convenience. Terminal 24a is coupled to the input terminal of flip-flop 102a, one input terminal of exclusive OR gate 104a, and one input terminal of AND gate 106a. Likewise, terminal 24b is coupled to one input terminal of each of elements 102b, 104b and 106b. Similarly, the Q output terminals of flip-flops 102a and 102b are coupled to the input terminals of flip-flops 110a, 110b, respectively, and to one input terminal of AND gates 112a, 112b, respectively. The Q output terminals of flip-flops 110a and 110b are coupled to the second input terminals of exclusive OR gate 104a and 104b, respectively. The output terminal of exclusive OR gates 104a and 104b are coupled respectively to the two input terminals of NAND gate 114.

The output terminal of NAND gate 114 is coupled to inverter 116, and to the second input terminals of AND gates 112a, 112b. The output terminal of inverter 116 is coupled to the second input terminals of 106a, 106b. AND gates 106a and 112a are direct coupled to an OR gate 118a. The same relationship applies to 106b, 112b and 118b. The output terminal of NAND gate 60 is coupled to the C input terminals of flip-flops 102a, 102b, 110a and 110b.

Operation of the circuit of FIG. 2 is as follows. Whenever gate 60 is primed as described in connection with FIG. 1, digital input information is continually received at terminals 24a and b, representing respectively the $2^0$ and $2^1$ bits of range data. As each clock pulse from clock 42 occurs (FIG. 1), the resultant logic 0 pulse at gate 60 enables each of flip-flops 102 and 110 to receive new data representing a new range point $X_i$, where $i = 0, 1, 2, \ldots 127$. For example, if flip-flops 110 contain a value representing RP 10 (hereafter when a flip-flop or a gate is mentioned without the letter designation, it will be understood that both elements are included), flip-flops 102 contain RP 11, and RP 12 is at terminals 24, the next logic 0 at NAND gate 60 will cause a date shift so that flip-flops 110 contain RP 11, flip-flops 102 contain RP 12, and terminals 24 contain the value of RP 13. Comparison of a range point such as 12 with the immediately preceding and following RPs such as 11 and 13, respectively, is accomplished as follows.

Figure 4:
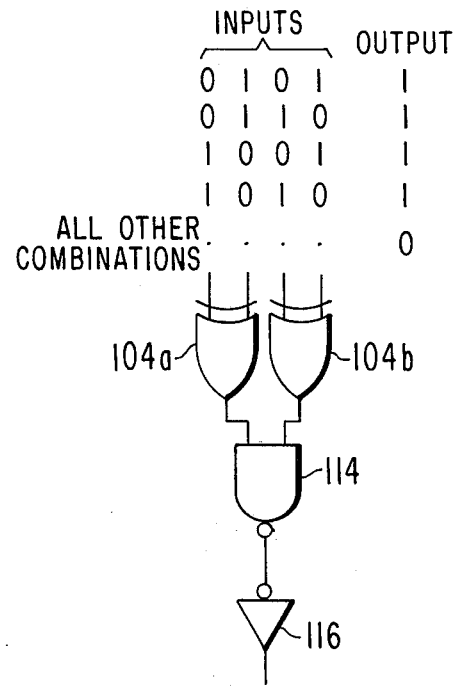
FIG. 4 is a truth table for one group of logic elements utilized in FIG. 2.

RP 11 is compared with RP 13 at exclusive OR gate 104—NAND gate 114 combination. The truth table for such a combination is illustrated in FIG. 4. It will be noted for FIG. 4 that if the two inputs to each exclusive OR gate are complementary (e.g. RP 11 = RP 13 or RP 11 ≠ RP 13), both exclusive OR gates 104a, b will be logic 1, and as indicated in FIG. 4, NAND gate 114 will produce a logic 0 while inverter gate 116 will produce a logic 1. If RPs 11 or 13 are identical, one or both of exclusive OR gates 104a, b will be at logic 0, and, as indicated in FIG. 4, inverter 116 will produce a logic 0. In summary, a logic 1 at the output of inverter 116 indicates identical values for RPs 11 and 13; a logic 0 indicates lack of equality.

A logic 1 (inequality) at NAND gate 114 primes gates 112 to pass RP 12 to terminals 28. A logic 0 (equality) at NAND gate 114 produces a logic 1 at the output terminal of inverter 116, which primes AND gates 106, which then pass RP 13 to terminals 28. If RPs 13 and 11 are identical in value, either could be chosen to be coupled to gates 106, the choice being one of practical engineering consideration. It will be noted that identicality of RPs following and preceding the one being compared do not indicate a identicality or lack of it between the preceding and following RP and the one being compared. If there is identicality, then, for example, the value of RP 13 is the same as RP 12, and no harm is done in passing the former rather than the latter to terminals 28.

When RP 12 ≠ RP 13 = RP 11, however, there is sufficiently strong indication RP 12 is merely a noise pulse to cause its value to be changed to that of RP 11 and RP 13 before being displayed.

Figure 3:
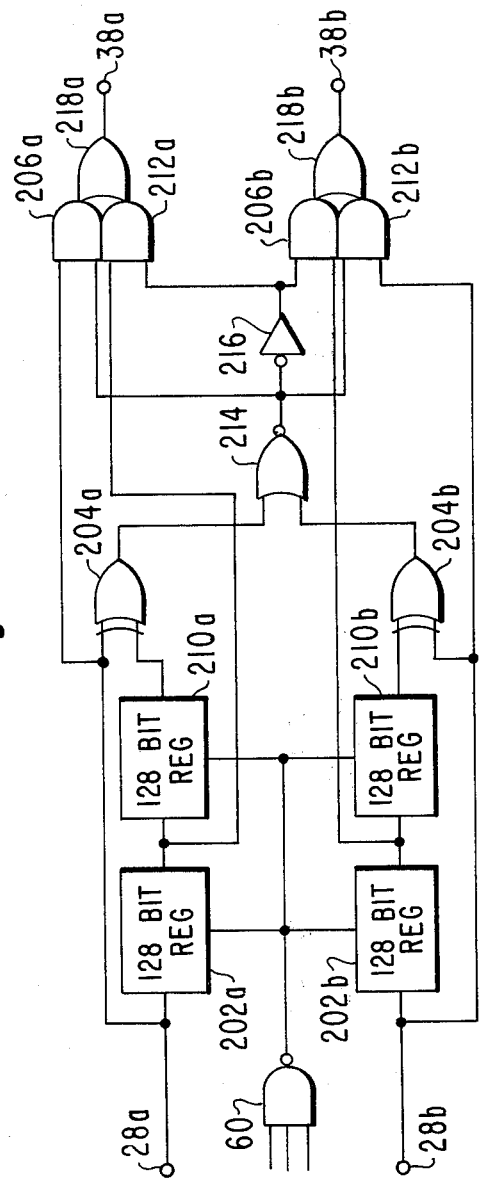
FIG. 3 is a logic diagram of an azimuth comparing circuit useful in the radar of FIG. 1.
Figure 5:
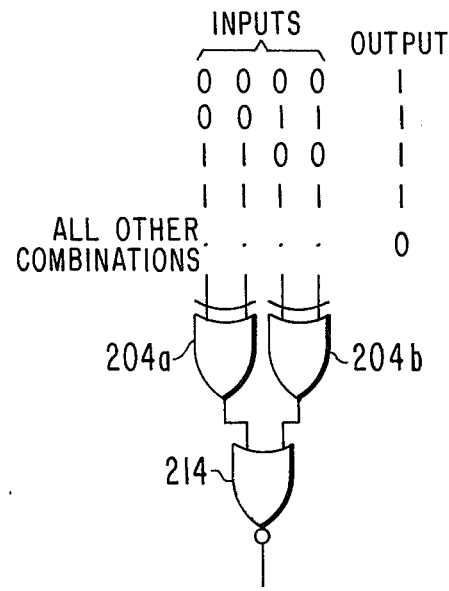
FIG. 5 is a truth table for one group of logic elements utilized in FIG. 3.

Terminals 28, FIG. 2, are coupled to the DXD azimuth logic circuit of FIG. 3, to which attention is now directed, and wherein terminals 28 are reproduced. Additionally, NAND gate 60 and terminals 38a, b are reproduced from FIG. 1. FIG. 3 is essentially identical to FIG. 2, except that 128 bit registers 202, 210 replace one bit registers of flip-flops 102, 110. It will be noted that similar components to those in FIG. 2 bear identical reference numerals increased by 100 (e.g. inverter 116, FIG. 2, inverter 216, FIG. 3). Operation of FIG. 3 is functionally identical to that of FIG. 2, except that 3 RPs spaced 128 RPs apart are compared. That is, the RPs at identical distances at 3 succeeding azimuth position are compared, and the modified data is passed via terminals 38 to buffer memory 36, FIG. 1. The truth table of FIG. 5 applies to gates 204 and gate 214. It will be noted that a NOR gate 214 replaces NAND gate 114. Further, there are some minor connection differences at gates 206, 212 relative to connections at 106, 112.

Operation of the radar system of FIG. 1 is as follows. Switch 44 is set by an operator to the maximum range of interest to him (e.g. 5 miles, 25 miles, etc.). Counters 50 and 62 are assumed to be set to counts of 0 and 2 respectively. Flip-flop 48 is presumed to be reset. Registers 18a, b, c, d, contain RPs from scans at four succeeding azimuths. (It will be noted that no initialization circuitry is shown in FIG. 1. To do so would unduly complicate an already complex figure. Such logic can easily be designed by a logic designer of ordinary skill in the art.)

The next PRF signal causes 3 events. First, it causes antenna 12 to rotate to the next incrementally increasing or decreasing position. Next, it causes the antenna to emit a radar pulse into the atmosphere. Third, it causes flip-flop 48 to become set. The resulting logic 1 from the Q terminal of flip-flop 48 primes NAND gate 46 and advances counter 62 to a count of 3. The logic 1 is also applied to NAND gate 60, but is ineffective since the logic 0 from decoder 64 disables gate 60. When gate 46 is primed, 128 serially produced periodic logic 0 pulses will appear at its output terminal to cause 128 RPs to be entered into 128 position register 18a. These 128 RPs represent the values of return signals to antenna 12 at 128 uniformly spaced intervals from 0 miles to the number of miles selected by switch 44. At the same time, information previously in registers 18a, 18b and 18c will be shifted one RP at a time into the next register 18b, 18c, 18d. The 128 logic 0 pulses at gate 46 also advance counter 50 so that the 128th pulse resets it to 0 producing a pulse at terminal 52 to reset flip-flop 48, disabling NAND gate 46.

The next PRF causes the actions previously outlined except that counter 62 is set to a count of 0, causing decoder 64 to produce a logic 1 signal, which, along with the logic 1 from flip-flop 48, primes NAND gate 60. Therefore, when the next clock pulse is produced by clock 42, several things occur concurrently. First, the digital value at the output terminal of converter 16 is entered into register 18a. Concurrently, the RPs in each of registers 18a–c is moved into the next position. Specifically, RPs in the last positions of registers 18a, b, and c are moved into the first positions of registers 18b, c, d, respectively. These three RPs as well as the RPs which concurrently exits register 18d, have in common the fact that they each represent the first range point data returned to antenna 12 at four succeeding azimuth locations.

The four RP values are applied to adder 20 and divide by four circuit 22 to produce a range point value which is the average of the four RP signals. Noninteger results are rounded up or down, as practical hardware considerations dictate. The average RP is next passed to DXD logic 26, where it will be compared with the adjacent two RPs for the preceding averaged azimuth as described in connection with the description of FIG. 2.

As mentioned earlier, no logic circuitry is shown for starting up or transition conditions. Thus, while it may be, for example, meaningless to compare a RP nearest the antenna in one azimuth with the RPs far from the antenna in another azimuth, no harm will be done. Nevertheless, if in some applications such comparison is undesirable, appropriate circuitry may be provided by a logic designer of ordinary skill in the art.

The operation just described is repeated 127 more times producing 128 averaged RPs at terminals 24 and then producing RPs with reduced noise at terminals 28. Thereafter, as mentioned in connection with the description of operation of FIG. 3, RPs at terminals 28 are compared with RPs representing the corresponding distances at preceding azimuths previously entered into registers 30 a, b, by DXD azimuth logic 34. While the RPs for the current azimuths are being entered into, register 30a, all under control of pulses from NAND gate 60, RP information at terminals 38 is applied to the proper location in buffer memory 36 replacing information that was previously stored there.

The next three PRF pulses will: (1) move antenna 12 three increments; (2) advance counter 62 to a count of three; and (3) result in pulses from gate 46 causing the loading of registers 18a, 18b, 18c with RPs at three new azimuths while moving the data in register 18c into 18d. The next PRF pulse will, among other things, indirectly cause counter 62 to recycle to 0 producing a pulse at decoder 64 to prime NAND gate 60. The operation described earlier is then repeated.

Independent of the rate at which entries are made into buffer memory 36, it is adapted to supply data to display 70 at a rate determined by clock source 92, a rate which is set to provide the required quality of presentation at display 70. In a standard radar system, clock 92 will produce pulses at a rate which is several times that of clock 42. However, in a system in which the rates of the two clocks are identical, there would be no need for buffer memory 36.

Clock 92 continually produces uniformly spaced momentary logic 1 pulses. Assume, for purposes of discussion that counter 94 is at a count of 0, that register 74 contains data for 128 RPs of some average azimuth which will arbitrarily be designated azimuth A and that flip-flop 86 is reset such that its Q terminal is at logic 0 and Q is at logic 1. Therefore, gates 78 and 96 are primed to pass respectively RP data from register 74 and clock pulses from clock 92. The next clock pulse performs 3 tasks: (1) The first range point for the azimuth next succeeding A (termed azimuth B) is entered into register 74, advancing each RP 1 position in the register and advancing the first RP for azimuth A to exit register 74; (2) it causes the first RP for azimuths A and B to be averaged in adder 76 and divide-by-two circuit 80 and the results stored in register 82; and (3) it advances counter 94 to a count of 1. The RP for azimuth A which is pushed out of register 74 passes through primed AND gate 78 through OR gate 88 and is displayed by display 70 at a position on the screen 70A determined by deflection control circuitry 99. The deflection control circuitry reflects the count in counters 94 and 98.

After the process above described is repeated 127 more times, azimuth A will have been refreshed in display 70, register 74 will contain data for azimuth B, register 82 will contain an average azimuth (A + B/2). It should be noted that as data enters register 82, old data will be driven out to gate 84. That gate is not, however, primed. The next clock pulse from clock 92 causes counter 94 to reset to 0, producing a momentary pulse at terminal 97, which advances counter 98 by 1 and toggles flip-flop 86 so that terminal Q produces a logic 1 and terminal Q produces a logic 0. The same clock pulse also advances the value of the first RP for azimuth (A + B/2) through primed gate 84 into display 70. The next 127 pulses from clock 92 advance counter 94 127 times causing the remaining 127 RPs to be applied to display 70. The count in counters 94 and 98 through deflection control circuitry 99 controls the position of each RP on screen 70A. The process just described repeats over and over continually updating display 70, the data for alternate azimuth lines coming from memory 36 and the data for the remaining azimuth lines coming from smoothing circuit 72.

It will be understood that the specifications used are for illustrative purposes only. The actual number of RPs or display points in each azimuth line and the number of azimuth lines will be suitably determined for the task to be performed.

What is claimed is:

1. In a display device for displaying a desired pattern in the form of a two-dimensional spot matrix, each spot having any one of a given plurality in excess of two of visually different characteristics comprising, in combination:

means producing serial multibit digital signals, the values of which represent the characteristics of the spots in said pattern, said signals including noise such that random ones of said signals have undesired values;

means comparing each multibit digital signal, $X_i$, with a signal $X_{i-1}$ representing the spot which immediately preceeds, and a signal $X_{i+1}$ representing the spot which immediately follows $X_i$, for producing a signal corresponding to each multibit digital signal except when $X_{i-1} = X_{i+1}$, and for then producing the signal $X_{i+1}$; and display means responsive to signals from said comparing means for displaying said spot matrix whereby the display exhibits a more visually pleasing pattern than if said comparing apparatus were not operative.

2. In a weather radar in combination:

means receptive of signals from a radar antenna for producing serially a plurality of multibit digital signals, each at one of a given plurality of values, the signals being serial at succeeding range points along a given azimuth and then at range points along succeeding azimuth positions.

means receptive of said multibit digital signals for comparing at a given azimuth each range point signal $X_i$ with the signals at the immediately preceding and following range points $X_{i-1}$ and $X_{i+1}$ for producing a signal corresponding to the value of $X_i$ except when $X_{i-1} = X_{i+1}$ and for then producing a signal corresponding to the value $X_{i\ 1}$; and a radar display receptive of signals of said comparing means for displaying in a range and azimuth a visual indication of said signals from said comparing means.

3. The combination as set forth in claim 2 wherein said comparing means comprises first and second stage serially coupled register means, each stage adapted to hold a signal representing one range point, the arrangement of said register means being adapted to pass signals received from said multibit digital signal producing means coupled to the input of said first stage and further comprising gate means receptive of signals from the output of said second stage and the input to said first stage for producing a signal having one value when the value of the input signals for all values thereof to the gate means agree and having a second different value when they disagree, and further including second gate means responsive to said value indicating agreement for producing a signal $X_{i+1}$ equivalent to the output signal at said second stage and responsive to said value indicating disagreement for producing an output signal equivalent to the signal $X_i$ at the output of said first stage.

4. The combination as set forth in claim 3, wherein said digital signal producing means produces signals at identical range points at succeeding azimuth positions and where said comparing means includes means for comparing a signal $X_{ij}$ at a given range point at a given azimuth $Y_i$ with signals $X_{i(j-1)}$ and $X_{i(j+1)}$ at the same range point at immediately preceding and following azimuths $Y_{i-1}$ and $Y_{i+1}$ and for producing the signal $X_{ij}$ except when $X_{i(j-1)} = X_{i(j+1)}$ and for then producing the signal $X_{ij\ 1)}$.

5. The combination, as set forth in claim 4, wherein said comparing means comprises additional third and fourth stage serially coupled register means, each stage adapted to hold signals representing all the range points at one azimuth, the input to the third stage being coupled to receive serially signals representing successive range points at each successive azimuth and further comprising third gate means receptive of signals from the output of said fourth stage and input to said third stage as the signal for each range point is applied to said additional register means for producing a signal having one value when the value of the input signals to said third gate agree and having a second different value when they disagree and further including fourth gate means responsive to said value indicating agreement for producing a signal $Y_{i+1}$ equivalent to the output signal at said fourth stage and responsive to said value indicating disagreement for producing an output signal equivalent to the signal $Y_i$ at the output of said third stage.

6. The combination as set forth in claim 2 further including averaging means coupled between said digital signal producing means, and comparing means responsive to signals from said radar antenna at a plurality of successive azimuths for producing signals at said succeeding range points which represent the average of signals from said plurality of azimuths at succeeding range points.

7. The combination as set forth in claim 2 further including smoothing means interposed between said comparing means and said display responsive to signals from said comparing means for supplying, to said display, range points at successive azimuth positions produced by said comparing means alternating with the average of range points at succeeding azimuth positions.

* * * * *

UNITED STATES PATENT OFFICE
CERTIFICATE OF CORRECTION

PATENT NO. : 4,023,165
DATED : May 10, 1977
INVENTOR(S) : Robert Alan Holt and Kenneth Charles Adam It is certified that error appears in the above-identified patent and that said Letters Patent are hereby corrected as shown below:

At Column 4, lines 20; 35; 59; 66, second occurrence and line 67, second occurrence, Column 5, line 22, Column 8, lines 9 and 36, respectively, change "Q" to -- $\overline{Q}$ --.

Column 2, line 54, change "$X_{i\ 1}$" to --$X_{i\pm1}$--;

Column 5, line 51, change "date" to --data--;

Column 5, line 62, insert "$\neq$" after 11;

Column 9, line 21, change "$X_{i\ 1}$" to --$X_{i\pm1}$--;

Column 10, line 8, change "$X_{i(j\ 1)}$" to --$X_{i(j\pm1)}$--;

Column 10, line 25, change "$Y_{i+1}$" to --$Y_{i\pm1}$--.

Signed and Sealed this ninth Day of August 1977

[SEAL]

Attest:

RUTH C. MASON
*Attesting Officer*

C. MARSHALL DANN
*Commissioner of Patents and Trademarks*